Jan. 6, 1942.  S. B. HENDRICKS  2,269,023
TRACTOR HITCH
Filed Sept. 14, 1938  2 Sheets—Sheet 1

INVENTOR.
SIMEON B. HENDRICKS
BY James A. Walsh
ATTORNEY

Jan. 6, 1942.   S. B. HENDRICKS   2,269,023
TRACTOR HITCH
Filed Sept. 14, 1938   2 Sheets-Sheet 2

*INVENTOR.*
SIMEON B. HENDRICKS
BY James A. Walsh
*ATTORNEY*

Patented Jan. 6, 1942

2,269,023

UNITED STATES PATENT OFFICE 2,269,023

TRACTOR HITCH

Simeon B. Hendricks, Rockford, Ill., assignor to J. I. Case Company, Racine, Wis., a corporation Application September 14, 1938, Serial No. 229,862

17 Claims. (Cl. 280—33.44)

The present invention relates to tractor hitches or draft means, and an object thereof is to generally improve the construction and operation of devices of this type.

A further object is to provide an improved draft means for a vehicle which is in part supported upon the drawing element.

Further objects are to provide such a means including a lost-motion connection between the drawing and the drawn elements; means for preventing separation of the relatively movable portions of the draft means; means for locking the elements together at an extreme position to prevent relative movement, when desired; means for releasing the locking means and such an arrangement of parts that the drawn element will be raised and lowered by the aforesaid lost motion, whereby to assist in coupling the drawn element and drawing element and to facilitate loading or unloading of the drawn element.

A further object is to provide such a lost-motion connection which will provide for the development of a certain amount of momentum in the drawing element before movement of the drawn element to assist in starting the drawn element.

More specifically an object is to provide such a draft means including an inclined runway or track member, a traveler member on the track, one of the members being carried on the drawn element and the other on the drawing element, whereby initial movement of the drawing element will cause lifting of the drawn element prior to forward movement thereof, stop means for preventing movement of the traveler completely off the track, and through which the drawing element ultimately propels the drawn element, and latch means for maintaining the members relatively fixed after the lifting operation.

Further objects and advantages will be apparent from the following specification and accompanying drawings in which.

Similar reference characters have been applied to the same parts throughout the specification and the various views of the drawings.

Figure 1:
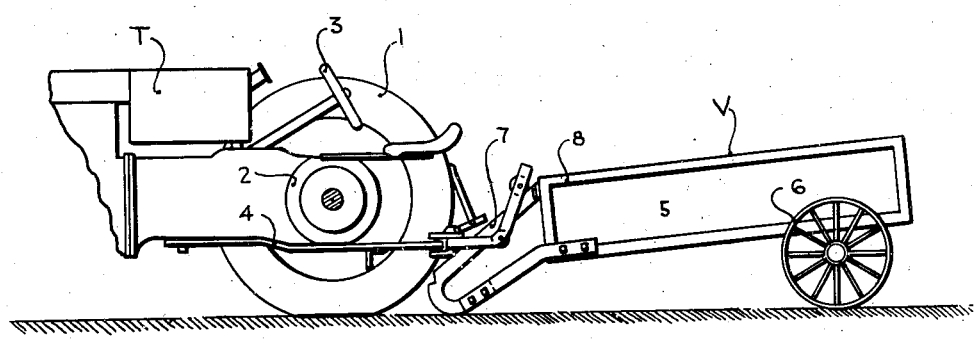
Figure 1 is a side elevation of the hitch as interposed between a tractor and a trailer vehicle.

As seen in Fig. 1, the apparatus illustrative of the present invention is interposed between a tractor generally designated as T and a vehicle generally designated as V, which may be any of a number of implements commonly drawn by and in part supported on the tractor, although certain advantages of the invention may be realized without the implement being so supported.

Tractor T may be of any suitable type having a rear wheel 1, a frame or transmission housing 2, a steering wheel 3 and a draw-bar 4, all of any usual or suitable type, while vehicle V, in the present instance, comprises a box or body portion 5, supported at its rear end, preferably, although not necessarily, on a wheel or wheels 6. Thus, lowering of the front end of the body portion will render the major portion of the box more accessible and convenient for loading than it is in its raised position.

Figure 2:
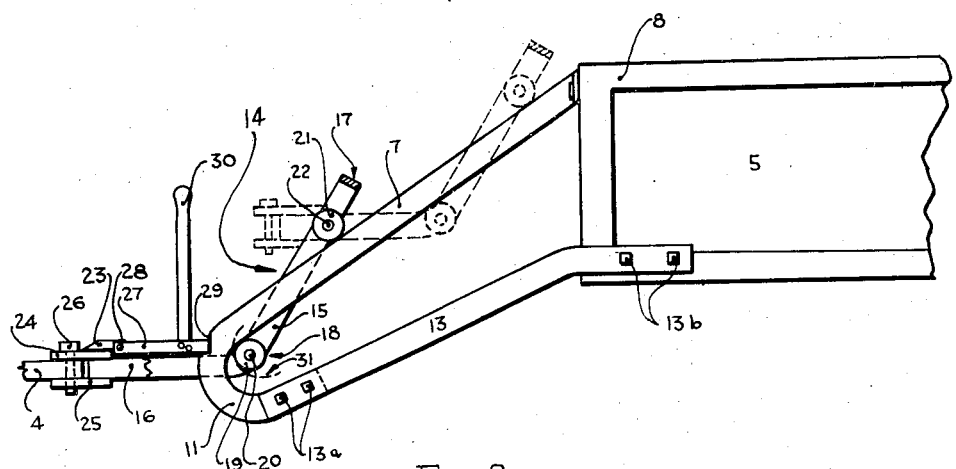
Fig. 2 is an enlarged side elevation of the hitch alone, with parts broken away, showing the hitch in a different position.
Figure 3:
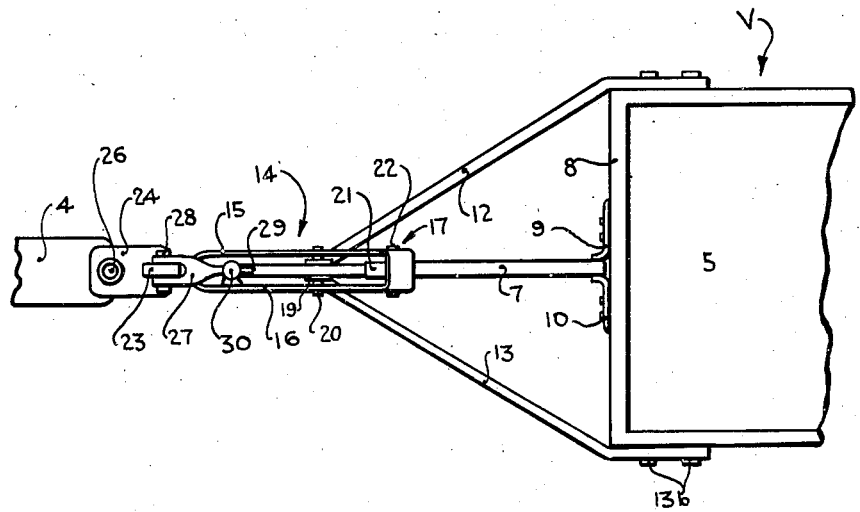
Fig. 3 is a plan view of the parts indicated in Fig. 2.

In the embodiment shown in Fig. 1, the hitch includes an inclined runway 7, suitably fixed with the front of box portion 5 8 as by angle braces 9 and 10, Figs. 2 and 3, suitably attached to the runway, as, for example, by welding, the whole forming a hitch element attached to box portion 5. The runway has a return bend or stop portion 11 to which are attached side braces 12 and 13 as by bolts 13ª—13ª, fixed in turn with the front 8 as by bolts 13ᵇ—13ᵇ for firmly bracing and steadying the outlying end of the runway, the complete structure being intended and constructed to carry the entire weight of the front end of the vehicle, either from the tractor or by resting on the ground.

A traveler generally designated as 14 cooperates with the runway for the hereinbefore enumerated purposes and includes a pair of side elements 15 and 16, conveniently made as a single strip of material bent double at 17 as shown and extending downwardly on either side of runway 7 at a steeper angle than the runway to a point 18, where it bends forwardly in a substantially horizontal direction. Below the runway, and between the members 15 and 16 is a roller 19 journaled on a pintle 20, and a similar roller 21 is disposed above the runway near point 17 and journaled on a pintle 22.

Beyond point 18 portions 15 and 16 are attached to a gusset or filler plate 23 from which ears 24 and 25 project for attachment to the tractor drawbar 4, a suitable pin or the like 26 uniting the parts as shown. Other details of construction at this point, or means of attachment to the drawbar, are contemplated as equivalent.

From the construction so far described it will be apparent that the weight of the box 5 applied to the runway and supported on the drawbar 4 will tend to cause clockwise rotation of the whole traveler element about pin 26, the downward thrust due to the weight being exerted against roller 19. This, however, is resisted by contact of roller 21 with the upper surface of runway 7, and a stable arrangement is produced, insofar as supporting the weight is concerned, with the exception, however, that the runway is free to move through the space between elements 15 and 16 from the position shown in Fig. 1 to that indicated in Fig. 2, the parts naturally taking the former position, with the stop portion 11 of the runway resting on the ground, but the traveler moving relatively to the runway upon initial movement of the tractor and raising the runway, and accordingly the front of the vehicle, until roller 19 encounters the stop portion 11, when the vehicle will be drawn forward in the usual manner.

To prevent return movement in the event of uneven ground, down-grade operation, or backing of the tractor when it is not desired to lower the trailing vehicle, a latch 27 is pivoted to filler plate 23, conveniently, although not necessarily in the form of a bifurcated bar, pivoted to the plate as by a pin 28, the free end of the bar dropping into a notch 29 near the lower end of the runway. A lever 30 or other suitable means is connected to the latch and may be arranged to be operated from the tractor when it is desired to disengage the latch and drop the front of the vehicle.

The radius of the return bend of runway 7, as clearly shown in Fig. 2, may be made greater than that of roller 19, and as a result the runway may be lifted slightly above its normal position in the event of excessive draft, as indicated by the dotted line at 31, thus giving a slight cushioning effect to reduce the stress incident to starting the load after the initial relatively free movement of the tractor. The force which it is possible to exert on the stop can be considered to vary from that necessary to lift the body portion 5 when the traveler is on the inclined portion of the runway to infinity, or at least to that represented by the strength of the parts, within the movement indicated by the difference between the full and dotted positions in Fig. 2, thus, through a cam action inherent in the construction, obtaining much the same effect as a heavy cushioning spring.

It is possible and often desirable to take advantage of the relative movement permitted by the length of the runway to assist in starting the load, as for example on uneven ground, or where the trailing vehicle is stuck in soft footing. Here the tractor may be backed the length of runway 7 and starter forward relatively free from load, or without the draft of the attached vehicle. Under these conditions it may start readily, whereas it might slip and be unable to start unless so relieved. When it reaches the end of the runway and roller 19 encounters stop portion 11 the tractor will have acquired appreciable momentum, and this will be at least partly expended in overcoming the inertia and ground resistance of the vehicle. Once started the tractor will usually be able to maintain itself and the vehicle in motion. If the roller 19 encountered a positive stop under these conditions the shock load developed might under certain conditions be too much for the parts and breakage would result, whereas, because of the above mentioned cushioning action the application of force, while abrupt, is not instantaneous, and the object is accomplished without damage.

Figure 6:
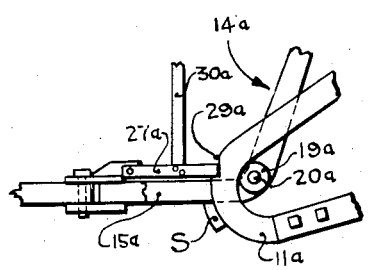
Fig. 6 is a fragmentary side elevation of a further modified arrangement.

On the contrary under certain conditions, where the limited freedom between the runway and traveler might be undesirable a positive stop S, Fig. 6, may be provided, fixed on portion 11ᵃ in such position as to prevent movement of the traveler 14ᵃ substantially beyond the point at which latch 27ᵃ engages with notch 29ᵃ. This gives a substantially rigid connection between the runway and traveler in the "up" position, but does not embody the cam or cushioning action above described in connection with Fig. 2, etc.

When it is desired to lower the vehicle body it is merely necessary to pull the lever 30, when the vehicle may gravitate to the position shown in Fig. 1, with the stop portion 11 resting on the ground, or if it does not, the tractor may be backed sufficiently to effect this. Uncoupling or recoupling the tractor is then a simple matter, as the vehicle is supported by the ground, and the drawbar is relieved of all weight except part of that of the traveler. Loading or unloading of the vehicle is also made easy by the relatively low tilted position of the body.

Figure 4:
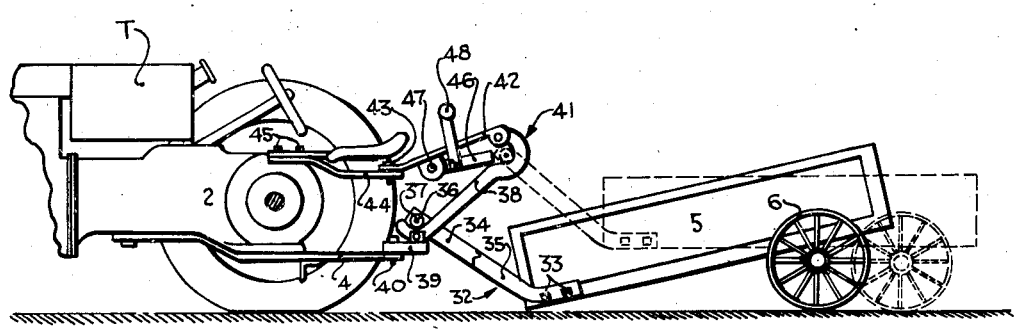
Fig. 4 is a side elevation of a modified form of the invention.

In the modified embodiment shown in Fig. 4 a similar, or identical vehicle box or body 5 has a forwardly and upwardly extending tongue element generally designated as 32 fixed with the body by suitable means such as bolts 33—33 and comprising side elements 34 and 35 converging to include a roller 36 therebetween, journaled upon a pintle 37. The roller travels on an inclined runway 38 supported by a portion 39 which may be pivoted as by a pin 40 to the drawbar 4 of the tractor. Runway 38 has a return-bend portion at 41 and it is braced against displacement by a member 42 pivoted as by a pin 43 to a bracing element 44 fixed as by bolts 45 to the tractor housing 2. As will be apparent, the vehicle will be elevated from the full line position of Fig. 4, upon forward movement of the tractor, to the upper position indicated in dotted lines, the vehicle being drawn forward by the tractor when the roller 36 reaches the return-bend at 41.

The roller, on its way to this point, pushes aside a latch 46 pivoted to member 42 at 47 and having a lever 48 fixed therewith which may be operated for releasing the latch for permitting the tongue and attached trailer vehicle to return to their lowered position, resting on the ground. The same shock dissipating or absorbing effect is present in the cooperation of roller 36 with the curved portion of runway 38 at 41, as is above described in connectoin with the embodiment of Figs. 1 to 3, inclusive, since the radius of the curved portion of the runway is substantially greater than that of the roller, so that the latter may be caused to lift the vehicle momentarily higher than its normal running position, thus avoiding shock loads on the parts.

As the tractor turns, runway 38 and its associated parts may remain in line with roller 36, the members 39 and 42 pivoting on pins 40 and 43 respectively.

As in the hereinbefore described embodiment, it is not necessary to lift the vehicle in order to attach the tractor, but merely to lift the runway 38 and its attached parts, placing pins 40 and 43 in position. Upon forward movement of the tractor the roller, tongue, and accordingly the vehicle, are raised to normal operating position, the roller being latched in position by the latch 46 and released when desired by manipulation of lever 48.

Figure 5:
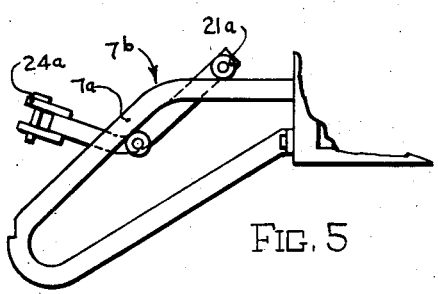
Fig. 5 is a side elevation of a modified form of the embodiment of Fig. 1.

A modified form of runway is shown in Fig. 5 having a bend at 7ᵇ, the movement of roller 21ᵃ upwardly and past the bend permitting a limited clock-wise rotation (as seen in the figure) of the traveler, whereby the draft connection represented by plate 24ᵃ may be raised higher than in the Fig. 1 embodiment, without raising the trailing vehicle. The construction and operation are otherwise the same as in the above described embodiment.

While several embodiments of the invention have been illustrated and described, it is to be understood that the invention is not to be taken as limited by anything in the drawings or description, or in fact in any manner except as defined in the subjoined claims.

What is claimed as new and desired to be secured by Letters Patent of the United States is:

1. In a tractor-drawn implement a vehicle arranged to be supported in part on the tractor and including on the vehicle a hitch having a runway inclined relatively to said vehicle and a traveling device on the tractor so constructed and arranged as to be freely movable along said runway, the parts being so arranged that the initial movement of the tractor, when starting the implement, will cause relative movement of said device along said runway and raising of said vehicle from a lowered loading position to a raised operating position.

2. A device as claimed in claim 1 including latch means for maintaining the implement in raised position only upon cessation of the driving force of the tractor.

3. In a tractor-drawn implement a vehicle having a wheel-supported rear end and a front end supported on the tractor and including a draw-bar element providing means fixed to the vehicle and relatively freely movable means fixed to the tractor, said means being so arranged that initial movement of the tractor will cause relative movement between said fixed and said movable means and raising of said front end from a lowered loading position to a raised operative position prior to movement of the implement as a whole and means adapted for maintaining said vehicle solely in said raised operative position.

4. In a tractor-drawn vehicle, draft means including a runway connected to the vehicle and a drawbar element arranged to be connected to the tractor and so constructed and arranged as to be freely movable relatively to the runway, stop means positioned to engage and to prevent movement of the drawbar element off the runway at the termination of the free movement of said drawbar element and through which said element may draw the vehicle, movement of the element relatively to the runway providing initial movement of the tractor prior to movement of the vehicle whereby the momentum of the moving tractor is utilized for starting the vehicle.

5. In a tractor-drawn vehicle, draft means including a runway element and a traveler element constructed and arranged to be freely movable on the runway, one of said elements being arranged to be attached to the vehicle and the other element being arranged to be attached to the tractor, stop means positioned to engage and to prevent movement of the traveler off the runway at the termination of the free movement of said drawbar element and through which said element may draw the vehicle, movement of the one element relatively to the other providing for initial movement of the tractor prior to movement of the vehicle, whereby the momentum of the moving tractor is utilized for starting the vehicle.

6. In a tractor-drawn implement a vehicle arranged to be supported in part on the tractor and including a hitch having a runway element inclined relatively to said vehicle and a traveler element constructed and arranged to be freely movable relatively to the runway element, one of the elements being arranged to be rigidly attached to the vehicle and the other element being arranged to be attached to the tractor, so that the initial movement of the tractor, when starting the implement will cause movement of one of said elements relatively to the other and raising of the vehicle from a lowered loading position to a raised operating position.

7. In a hitch for a propelling and a trailer vehicle, a runway attached to one of the vehicles and curved at its end to form a stop portion, a traveler attached to the opposite vehicle element, a roller on the traveler mounted to traverse the runway, means for securing the roller in the curved stop portion of the runway to sustain the trailer in raised position and to propel it through engagement with said curved stop portion, and means for releasing said securing means to free the roller for relative movement of the traveler in a direction to lower the trailer in relation to the ground.

8. In a hitch for a propelling and a trailer vehicle, a runway mounted on one of the vehicles, a traveler mounted on the opposite vehicle, said traveler being adapted to traverse the runway to provide initial movement of the propelling vehicle relatively to the trailer, said runway having a curved portion arranged to be engaged by the traveler and so disposed as to arrest the relative movement between the propelling and the trailer vehicles, and said curved portion being so shaped as to cause a limited raising movement of said trailer beyond the normal trailing point, with corresponding movement of the propelling vehicle forwardly beyond the normal trailing point, whereby to dissipate the shock incident to starting the trailer vehicle.

9. In a tractor-drawn vehicle, draft means including a runway connected to the vehicle and a drawbar element arranged to be connected to the tractor and movable relatively to the runway, stop means positioned to engage the drawbar element and to prevent movement thereof off the runway, and through which said tractor may draw said vehicle, said stop means being shaped to guide the drawbar element for dissipating shock loads incident to starting of the vehicle by the moving tractor.

10. In a tractor-drawn vehicle, draft means including a runway connected to the vehicle and a drawbar element arranged to be connected to the tractor and having a roller arranged to traverse the runway, and a curved portion on the runway of greater curvature than the roller and positioned to engage the roller and provide a stop portion through which the tractor may draw the vehicle.

11. In a hitch for a tractor and a trailer vehicle a runway, upwardly inclined toward the trailer from a point below and in advance thereof, and a traveler element including a normally substantially horizontal drawbar portion having means engaged below the runway and other means engaged above the runway, and spaced lengthwise of the runway from the first mentioned means, to rest upon the upper surface of the runway and prevent rotation of the drawbar element under the weight of the trailer when supported by the drawbar on the tractor, and said runway being directed intermediate its length from said upwardly inclined direction to a substantially horizontal direction, whereby the second mentioned means, by passing from said inclined portion of the runway to said substantially horizontal portion may provide for limited upward rotation of said drawbar element about said first mentioned means to give a greater range of upward movement to the drawbar than would the travel thereof along the runway alone.

12. In a tractor hitch including a forwardly extending downwardly inclined runway fixed on a drawn implement, a traveler comprising an inverted U shaped member, a roller within the U shaped member and bearing on the upper side of said runway, a second roller within said U shaped member and bearing on the underside of said runway, said member being arranged to include said inclined runway between said rollers and between its sides, said member having a portion curving from said second roller to a direction for attachment to a tractor, and means on the last named portion for attachment to a tractor.

13. In a tractor drawn vehicle, draft means including a forwardly and downwardly extending runway connected to the vehicle, a draw bar element arranged to be connected to the tractor, and so constructed and arranged as to be freely movable on the runway, stop means positioned to prevent movement of the draw bar element off the runway, a latch on the draw bar element and a portion on the runway positioned to engage with the latch when the draw bar element is located adjacent the stop means to maintain the vehicle in raised position after cessation of the driving force of the tractor.

14. In a tractor drawn vehicle, draft means including a forwardly extending runway and brace structure, including a forwardly and downwardly extending runway, a draw bar element arranged to be connected to the tractor, and so constructed and arranged as to be freely movable on the runway, stop means positioned to prevent movement of the draw bar element off the runway, latch means adapted for engagement between the draw bar element and said forwardly extending runway and brace structure when the draw bar element is located adjacent the stop means to maintain the vehicle in raised position after cessation of the driving force of the tractor.

15. In a tractor drawn implement comprising a vehicle having a wheel-supported rear end, a hitch for connecting the vehicle with a tractor including a forwardly extending downwardly inclined runway fixed on the forward end of the vehicle, and a traveler member guided on the runway to extend in a direction substantially parallel to the longitudinal axis of said vehicle and adapted to be freely movable along said runway, said traveler member being arranged to be pivotally connected to a tractor whereby to provide for turning of the tractor without cramping of the traveler on the runway and whereby initial movement of the tractor will cause raising of the vehicle by virtue of movement of the traveler member along the inclined runway.

16. In a tractor drawn implement adapted to be supported in part on the tractor, a hitch for connecting the implement with a tractor including a forwardly extending downwardly inclined runway fixed on the forward end of the implement and a traveler member guided on the runway to extend in a direction substantially parallel to the longitudinal axis of said implement and adapted to be freely movable along said runway, said traveler member being arranged to be pivotally connected to a tractor whereby to provide for turning of the tractor without cramping of the traveler on the runway and whereby initial movement of the tractor will cause raising of the implement by virtue of movement of the traveler member along the inclined runway.

17. In a tractor drawn implement adapted to be supported in part on the tractor, a hitch for connecting the implement with the tractor including forwardly extending downwardly inclined means on the forward portion of the vehicle, a member guided on said means to extend in a direction substantially parallel to the longitudinal axis of said vehicle and adapted to be freely movable along said means, said member being pivotally connected to a tractor whereby to provide for turning of the tractor without cramping of said member on said means and whereby initial movement of the tractor will cause raising of the implement by virtue of movement of said member along said means.

SIMEON B. HENDRICKS.